United States Patent
Chen et al.

(10) Patent No.: US 9,893,483 B2
(45) Date of Patent: Feb. 13, 2018

(54) CARD TRAY OF ELECTRICAL CONNECTOR ASSEMBLY HAVING A STAMPED AND FORMED METALLIC PLATE

(71) Applicant: FOXCONN INTERCONNECT TECHNOLOGY LIMITED, Grand Cayman (KY)

(72) Inventors: Chin-Yu Chen, New Taipei (TW); Shun-Jung Chuang, New Taipei (TW)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

(21) Appl. No.: 15/404,526

(22) Filed: Jan. 12, 2017

(65) Prior Publication Data

US 2017/0207591 A1 Jul. 20, 2017

(30) Foreign Application Priority Data

Jan. 14, 2016 (TW) .............................. 105101015 A (51) Int. Cl.
*H01R 24/00* (2011.01)
*H01R 31/06* (2006.01)
*H01R 13/6581* (2011.01)

(52) U.S. Cl.
CPC ......... *H01R 31/06* (2013.01); *H01R 13/6581* (2013.01)

(58) Field of Classification Search
CPC ............ H01R 23/7005; H01R 23/6873; G06K 7/0021; G06F 1/184; H05K 1/117
USPC .................. 439/64, 607.31, 630, 928.1, 951
See application file for complete search history.

(56) References Cited

U.S. PATENT DOCUMENTS

| 7,112,075 | B1* | 9/2006 | Su ........................ G06K 7/0021 439/159 |
| 7,156,667 | B2* | 1/2007 | Ge ......................... H01R 13/73 439/64 |
| 7,794,232 | B2* | 9/2010 | Ogatsu ................... G06K 13/06 439/64 |
| 8,439,696 | B2* | 5/2013 | Zhou .................... G06K 7/0021 439/188 |
| 9,001,501 | B2 | 4/2015 | Molex |
| 9,378,436 | B2* | 6/2016 | Wang ..................... G06K 13/08 |
| 9,445,521 | B2* | 9/2016 | Tan ....................... G06K 7/0021 |
| 9,652,639 | B2* | 5/2017 | Motohashi ............... G06K 7/00 |
| 9,652,697 | B2* | 5/2017 | Nagase .................. G06K 13/08 |

(Continued)

FOREIGN PATENT DOCUMENTS

| CN | 2368188 | 3/2000 |
| CN | 2572615 | 9/2003 |

(Continued)

*Primary Examiner* — Thanh Tam Le
(74) *Attorney, Agent, or Firm* — Wei Te Chung; Ming Chieh Chang (57) ABSTRACT

A card connector assembly includes: an electrical connector including an insulative housing, plural terminals secured to the insulative housing, and a shell covering the insulative housing to form a receiving cavity; and a card tray removably received in the receiving cavity, the card tray including an insulative frame and a metallic plate, the metallic plate has a recessed portion for engaging the electrical connector and an opening bordering the recessed portion.

13 Claims, 8 Drawing Sheets

(56) References Cited

U.S. PATENT DOCUMENTS

| | | | | |
|---|---|---|---|---|
| 2016/0028172 A1* | 1/2016 | Motohashi | ............ | H01R 12/716 |
| | | | | 439/160 |
| 2016/0111802 A1* | 4/2016 | Shimotsu | ........... | H01R 12/7076 |
| | | | | 439/159 |
| 2016/0164225 A1* | 6/2016 | Nagase | ................ | H04B 1/3816 |
| | | | | 439/159 |

FOREIGN PATENT DOCUMENTS

| | | |
|---|---|---|
| CN | 202977786 | 6/2013 |
| CN | 203434338 | 2/2014 |
| TW | M413238 | 10/2011 |

* cited by examiner

CARD TRAY OF ELECTRICAL CONNECTOR ASSEMBLY HAVING A STAMPED AND FORMED METALLIC PLATE

BACKGROUND OF THE INVENTION

1. Field of the Invention

The present invention relates to an electrical connector assembly having a card tray with a metallic plate formed by stamping and bending to realize mass production thereof.

2. Description of Related Arts

China Patent No. 203434338, issued on Feb. 12, 2014, discloses a SIM (Subscriber Identity Module) card connector assembly including a card tray and an electrical connector. The card tray includes an insulative part and a metallic plate. The electrical connector includes a terminal module and a metallic shell. The metallic plate of the card tray has a pair of protrusions and the terminal module has a pair of retaining portions for engaging the protrusions.

U.S. Pat. No. 9,001,501, issued on Apr. 7, 2015, discloses a metallic card tray and a card connector. The card connector includes a slider. The card tray has a top panel portion, a side panel portion, and an engaging portion formed independently from the side panel portion. The engaging portion has a protruding portion. A slit-shaped separating opening is formed in the boundary portion between the top panel portion and the engaging portion. In this way, the engaging portion can be elastically deformed and smoothly engage/disengage the slider.

SUMMARY OF THE INVENTION

A card connector assembly comprises: an electrical connector including an insulative housing, a plurality of terminals secured to the insulative housing, and a shell covering the insulative housing to form a receiving cavity; and a card tray removably received in the receiving cavity, the card tray including an insulative frame and a metallic plate, the metallic plate has a recessed portion for engaging the electrical connector and an opening bordering the recessed portion. Such metallic plate design of the card tray is readily put to mass production.

DETAILED DESCRIPTION OF THE PREFERRED EMBODIMENT

Referring to FIGS. 1 to 8, a card connector assembly 100 comprises: an electrical connector including an insulative housing 1, a plurality of terminals 2 secured to the insulative housing 1, and a shell 5 covering the insulative housing 1 to form a receiving cavity 10; and a card tray 3 removably received in the receiving cavity 10. The electrical connector further includes a pair of metallic deflectable retaining arms 6 and an ejector 4.

The insulative housing 1 has a pair of guiding grooves 11, as shown in FIG. 11. The terminals 2 are insert molded in the insulative housing 1 and include first terminals 21 at the front, second terminals 22 in the middle, and third terminals 23 at the rear.

The ejector 4 is mounted on one side of the insulative housing 1 and includes a push rod 41 and a pivot 42 coupled to an end of the push rod 41.

The card tray 3 includes an insulative frame 31 and a metallic plate 32 insert molded together and a pair of recesses 33. The card tray 3 has a first receiving space 34 for accommodating a first electronic card, a second receiving space 35 for accommodating a second electronic card, and a third receiving space 36 for accommodating a third electronic card. The second receiving space 35 and the third receiving space 36 may overlap.

The metallic plate 32 includes a main part 321, a pair of side walls 323, a respective recessed portion 322 on a corresponding side wall 323, and a respective opening 320 bordering the associated recessed portion 322. The recessed portion 322 has a first and second side arms 3220 and 3222 and an intermediate straight arm 3221 between the first and second side arms 3220 and 3222. Notably, the recessed portion 322 performs as a reliable fixed beam because the first side arms 3220 and the second side arm 3222 are respectively connected/fixed to the side wall 323 with the corresponding fixed ends.

The insulative frame 31 includes two side beams 310, a respective fitting portion 312 on a corresponding side beam 310, and a cross beam 311. The fitting portion 312 includes an upper part 3120 and a lower part 3121. The lower part 3121 is substantially flush with the recessed portion 322 of the metallic plate 32. The upper part 3120 is further recessed inward away from the recessed portion 322 of the metallic plate 32.

Figure 1:
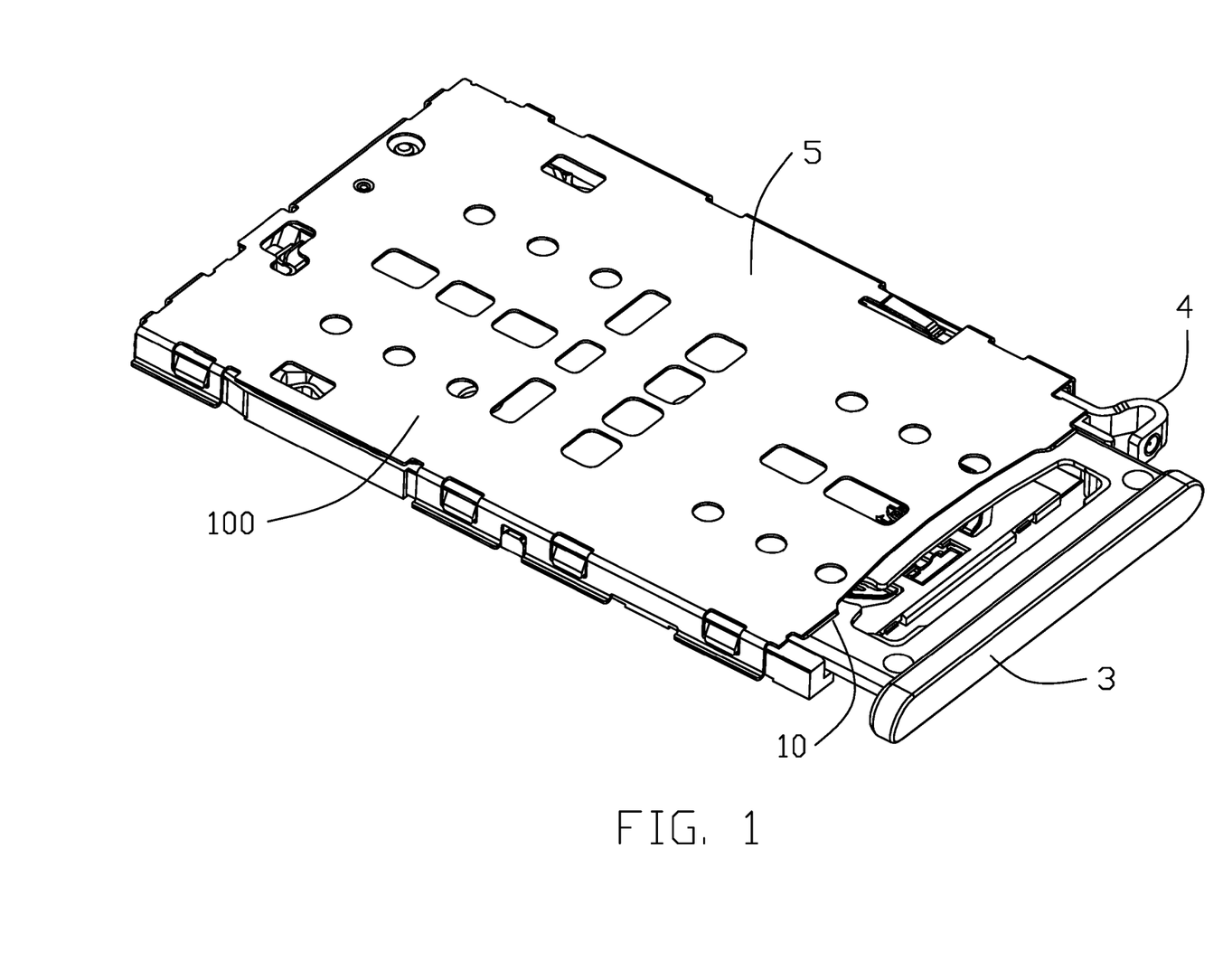
FIG. 1 is a perspective view of a card connector assembly incorporating a card tray in accordance with the present invention.
Figure 2:
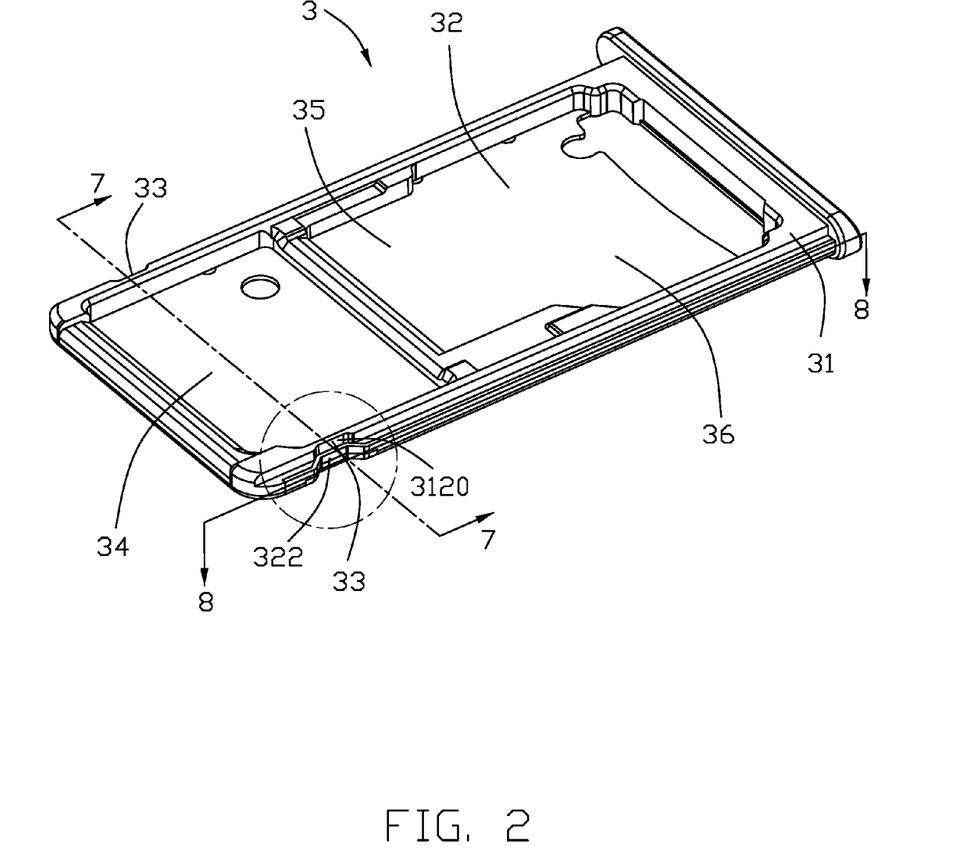
FIG. 2 is a perspective view of the card tray.
Figure 3:
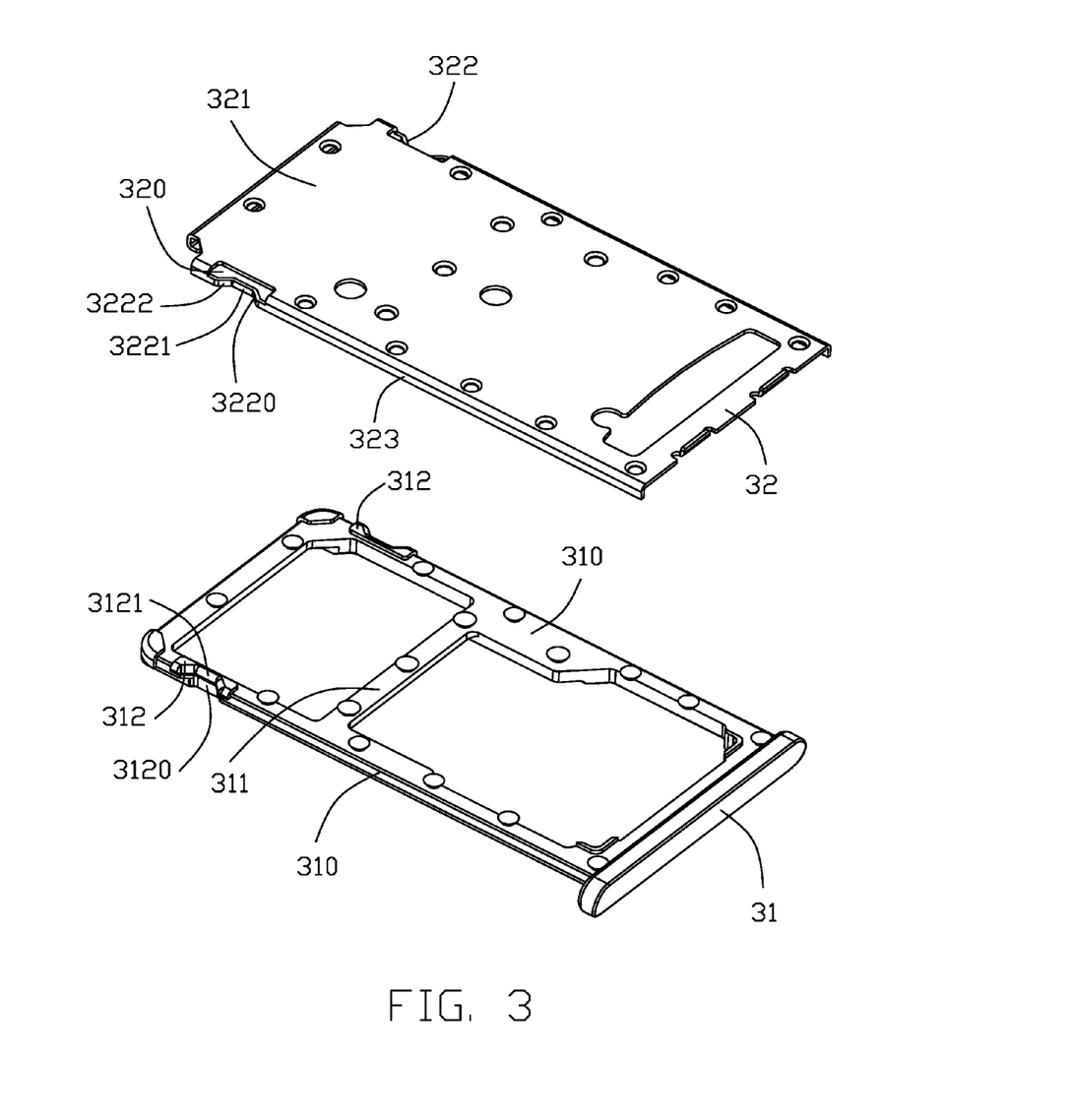
FIG. 3 is an exploded view of the card tray.
Figure 4:
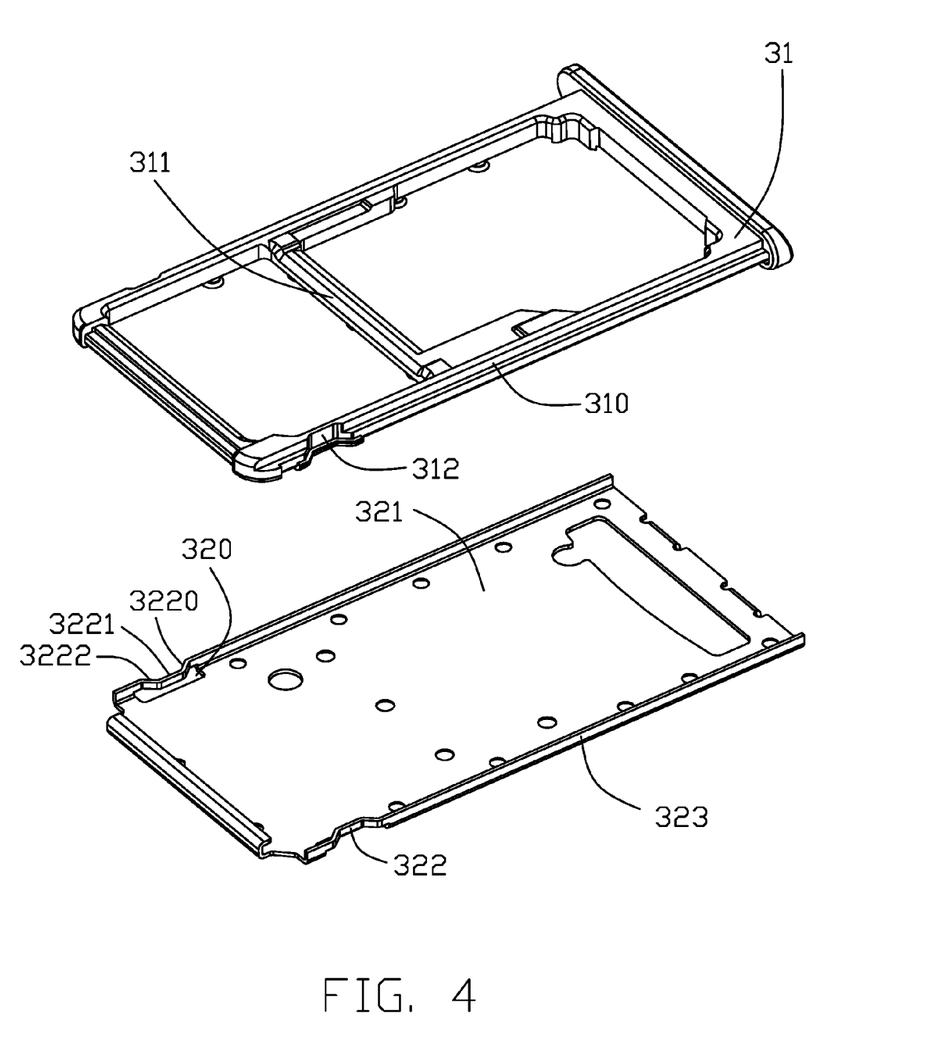
FIG. 4 is another exploded view of the card tray.
Figure 5:
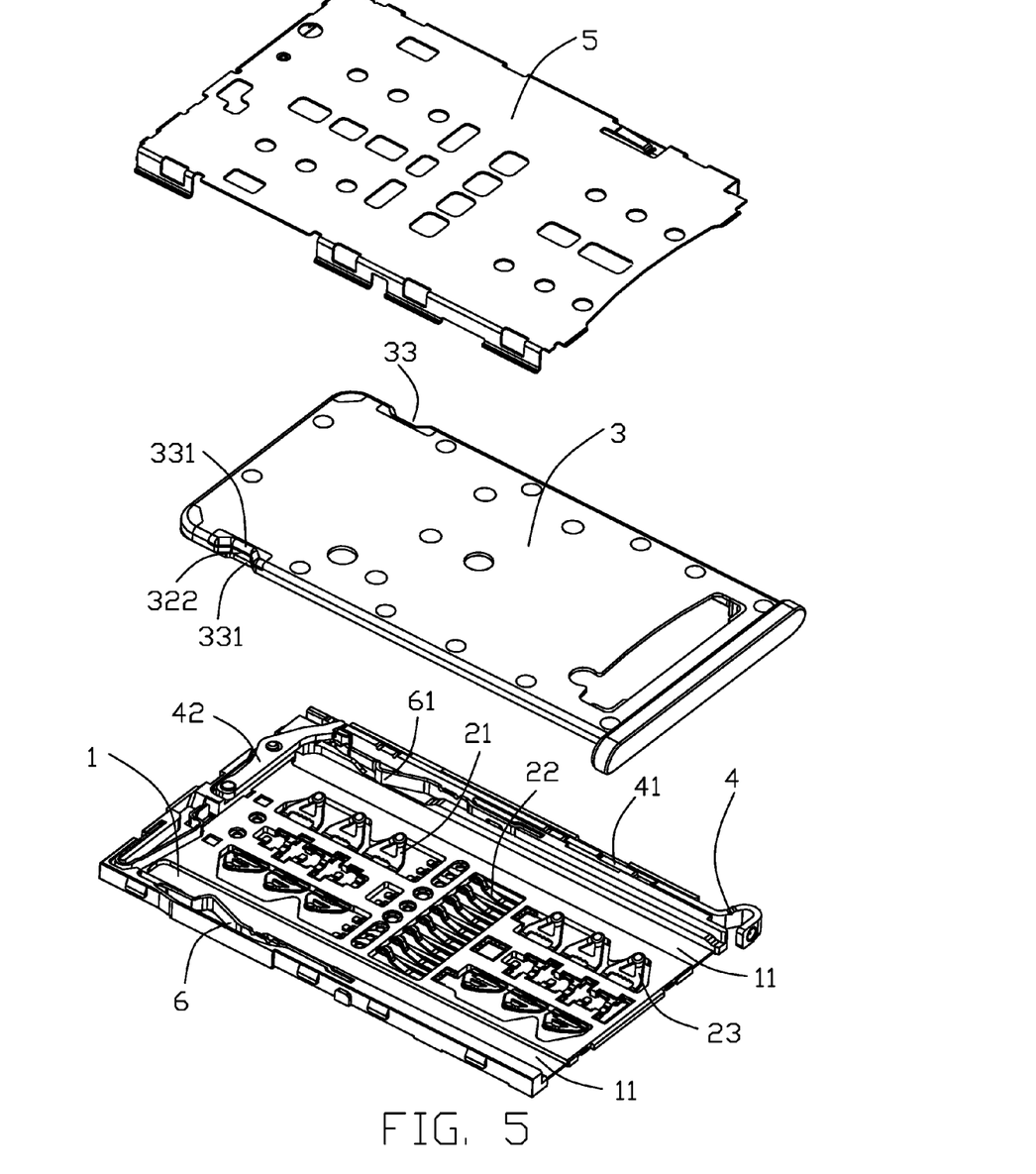
FIG. 5 is an exploded view of the card connector assembly of FIG. 1.
Figure 6:
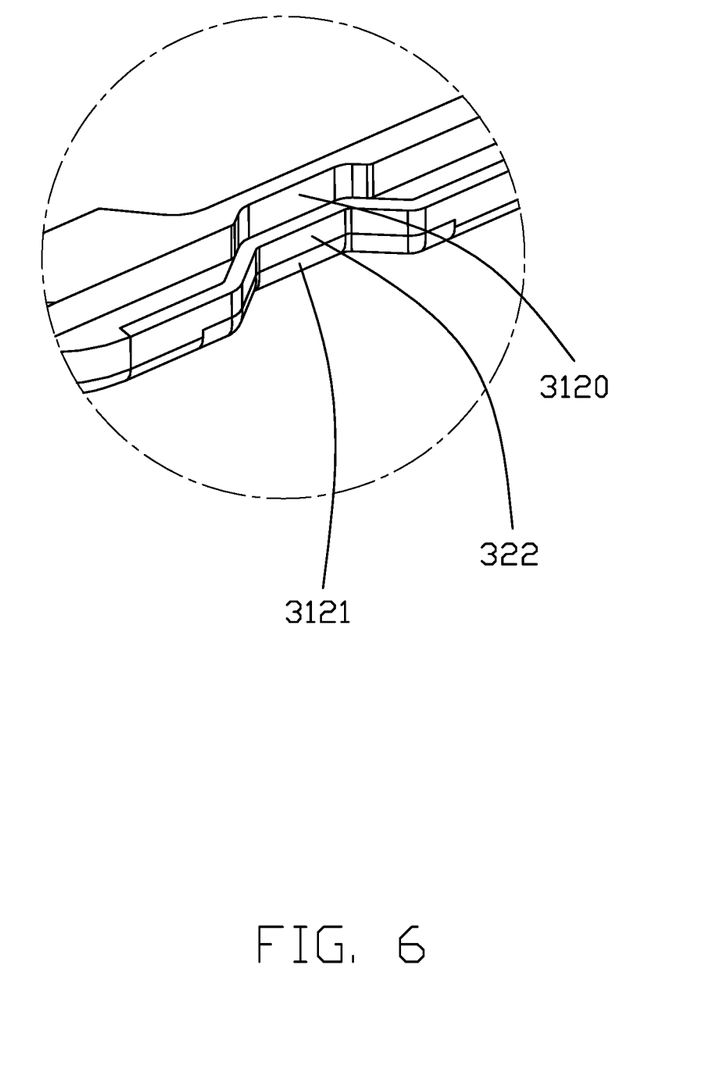
FIG. 6 is an enlarged view of a circled portion of the card tray in FIG. 2.
Figure 7:
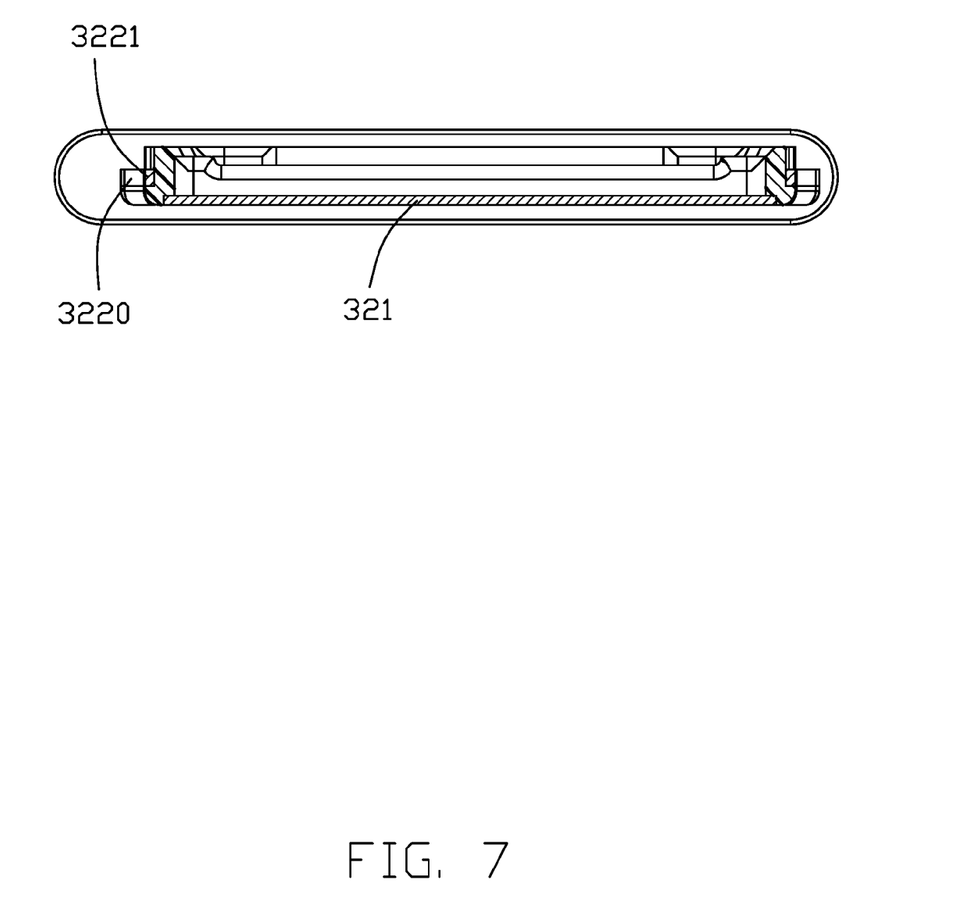
FIG. 7 is a cross-sectional view of the card tray along line 7-7 of FIG. 2.
Figure 8:
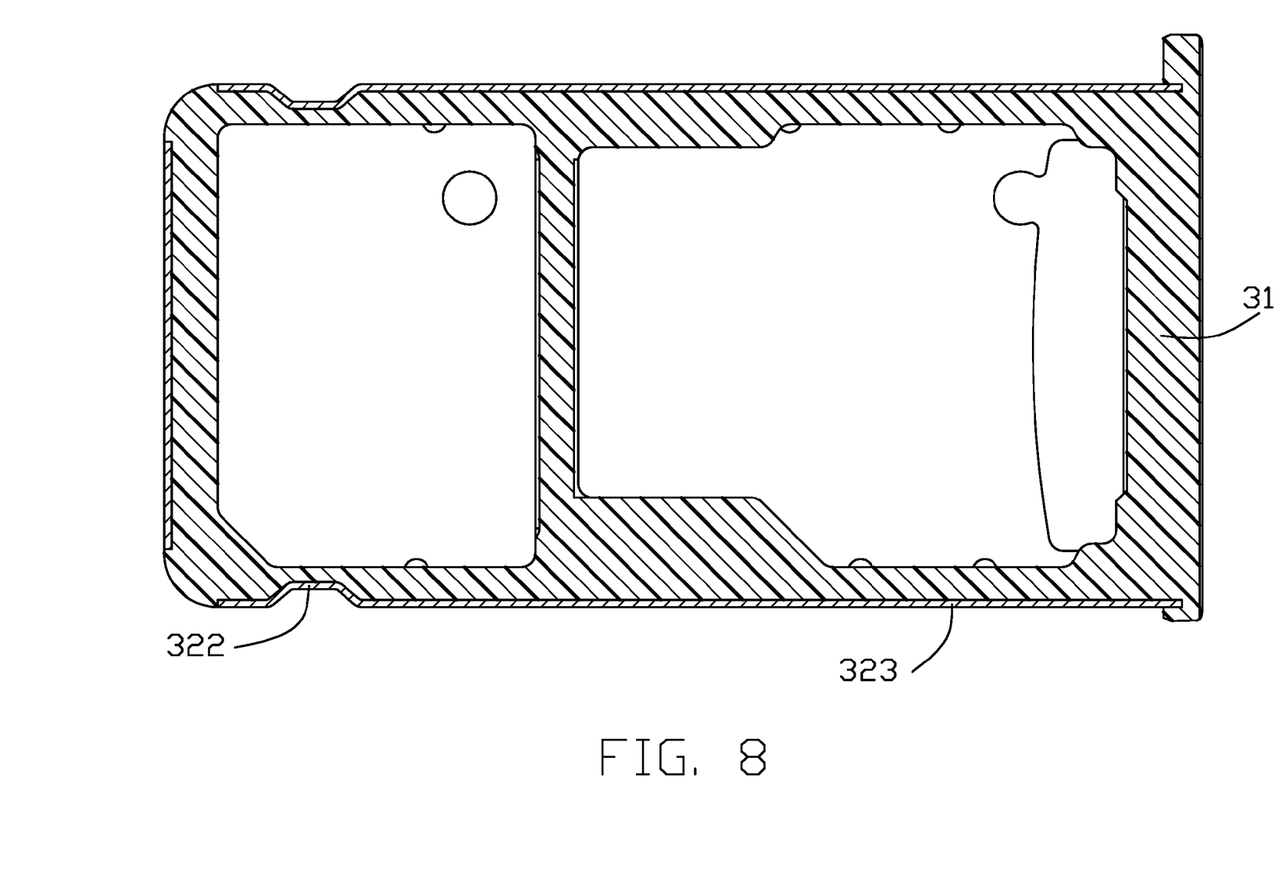
FIG. 8 is a cross-sectional view of the card tray along line 8-8 of FIG. 2.

The retaining arm 6 has a part 61 protruding into the receiving cavity 10, as shown in FIG. 5.

With the frame 31 and the plate 32 insert molded, the fitting portion 312 substantially fills the opening 320 of the metallic plate 32 for preventing a horizontal relative movement between the frame 31 and the plate 32, the side beams 310 are positioned inward of the side walls 323, and the lower part 3121 is substantially flush with the recessed portion 322. The recessed portion 322 is exposed to the recess 33 for engaging the protruding part 61 of the retaining arm 6.

The first electronic card may be a SIM card, the second electronic card an SD card, and the third electronic card a SIM card. In the embodiment shown, the card tray 3 may receive two SIM cards simultaneously, or one SIM card and one SD card at the same time. As can be understood, the first second, and third cards are to mate with the first, second, and third terminals.

When inserting the card tray 3 into the connector, the side beams 310 are guided by the grooves 11. The arm 6 retains and the ejector 4 rejects the card tray 3 in a well known manner.

In preparing the card tray 3, preferably the openings 320 are formed by stamping or punching operation first, and then the recessed portions 322 are formed by bending operation. With these operations, mass production of the card tray 3 may be easily achieved. Notably, in this embodiment, the main part 321 forms a plurality of circular through holes (not labeled) filled by material of the insulative frame 31 for retaining the insulative frame 31 and the metallic plate 34 together as an integral piece.

What is claimed is:

1. A card connector assembly comprising:
an electrical connector including an insulative housing, a plurality of terminals secured to the insulative housing, and a shell covering the insulative housing to form a receiving cavity; and
a card tray removably received in the receiving cavity, the card tray including an insulative frame and a metallic plate, the metallic plate has a recessed portion for engaging the electrical connector and an opening bordering the recessed portion; wherein
the insulative frame and the metallic plate are insert-molded together;
the metallic plate comprises a main part and a side wall, and the recessed portion is formed by the side wall and integrally connected first and second side arms and an intermediate straight arm between the first and second side arms; and;
the side wall is straight and integrally connected to the main part except for the recessed portion.

2. The card connector assembly as claimed in claim 1, wherein the frame includes a fitting portion substantially filling the opening.

3. The card connector assembly as claimed in claim 2, wherein said fitting portion has a lower part flush with the recessed portion.

4. The card connector assembly as claimed in claim 2, wherein said fitting portion has an upper part further inwardly recessed away from the recessed portion.

5. The card connector assembly as claimed in claim 1, wherein the connector includes a metallic deflectable retaining arm with thereof an inward protrusion received and engaged in the recessed portion in a deformable manner.

6. The card connector assembly as claimed in claim 1, wherein said metallic plate includes a horizontal main part forming a plurality of through holes filled by insulative material of the frame.

7. An electrical connector assembly comprising:
an electrical connector including an insulative housing, a plurality of terminals secured to the insulative housing, and a metallic shell covering the insulative housing to form a receiving cavity, the housing being equipped with a metallic deflectable retaining arm having an inwardly protruding part;
a card tray removably received in the receiving cavity along a front-to-back direction, and including an insulative frame and a metallic plate integrally formed with the insulative frame via an insert-molding process, the metallic plate having a horizontal main part and a pair of side walls unitarily extending upwardly from two opposite lateral side edges of the main part; and;
a recessed portion is formed on one of the side walls to mechanically and electrically engage the protruding part for both retaining and grounding; wherein
said recessed portion includes a first and second side arms respectively connected to the corresponding side wall in a front-to-back direction with an intermediate arm therebetween in said front-to-back direction to perform as a fixed beam; and;
the one of the side walls is straight and integrally connected to the main part except for the recessed portion.

8. The electrical connector assembly as claimed in claim 7, wherein said metallic plate forms an opening, and the frame forms a fitting portion snugly fills the opening for preventing a horizontal relative movement between the frame and the plate.

9. The electrical connector assembly as claimed in claim 8, wherein said opening borders the recessed portion, and a lower part of the fitting portion is flush with the recessed portion.

10. The electrical connector assembly as claimed in claim 9, wherein the lower part of the fitting portion is located at a corner between the main part and the corresponding side wall.

11. The electrical connector assembly as claimed in claim 7, wherein the main part forms a plurality of circular through hole filled with material of the insulative frame.

12. An electrical connector assembly comprising:
an electrical connector including an insulative housing, a plurality of terminals secured to the insulative housing, and a metallic shell covering the insulative housing to form a receiving cavity, the housing being equipped with a metallic deflectable retaining arm having an inwardly protruding part; and
a card tray removably received in the receiving cavity along a front-to-back direction, and including an insulative frame and a metallic plate assembled together, the metallic plate having a horizontal main part and a pair of side walls unitarily extending upwardly from two opposite lateral side edges of the main part; wherein
a recessed portion is formed on one of the side walls to mechanically and electrically engage the protruding part for both retaining and grounding; and
an opening formed in the main part and bordering the recessed portion; wherein
the frame includes a fitting portion substantially fills the opening; wherein
said fitting portion has a lower part flush with the recessed portion; wherein
said fitting portion has an upper part located above the recessed portion, inwardly recessed away from the recessed potion, and outwardly and laterally exposed to an exterior; wherein;
said recessed portion includes a first and second side arms respectively connected to the corresponding side wall in a front-to-back direction with an intermediate arm therebetween in said front-to-back direction so as to perform as a fixed beam; and wherein
the one of the side walls is straight and integrally connected to the horizontal main part except for the recessed portion.

13. The electrical connector assembly as claimed in claim 10, wherein said lower part is located at a corner between the main part and the corresponding side wall.

* * * * *